Feb. 28, 1956   J. R. FERGUSON   2,736,879
TRAFFIC SIGNAL

Filed Sept. 16, 1952   7 Sheets-Sheet 1

INVENTOR
JAMES ROBERT FERGUSON

BY *Mason, Mason & Sheridan*

ATTORNEYS

Feb. 28, 1956      J. R. FERGUSON      2,736,879
TRAFFIC SIGNAL

Filed Sept. 16, 1952      7 Sheets-Sheet 2

INVENTOR
JAMES ROBERT FERGUSON

ATTORNEYS

Feb. 28, 1956 J. R. FERGUSON 2,736,879
TRAFFIC SIGNAL
Filed Sept. 16, 1952 7 Sheets-Sheet 4

INVENTOR
JAMES ROBERT FERGUSON
BY *Naston, Naston & Sheridan*
ATTORNEYS

Feb. 28, 1956  J. R. FERGUSON  2,736,879
TRAFFIC SIGNAL
Filed Sept. 16, 1952  7 Sheets-Sheet 5

INVENTOR
JAMES ROBERT FERGUSON
BY *Mason, Mason & Sheridan*
ATTORNEYS

Feb. 28, 1956  J. R. FERGUSON  2,736,879
TRAFFIC SIGNAL
Filed Sept. 16, 1952  7 Sheets-Sheet 6
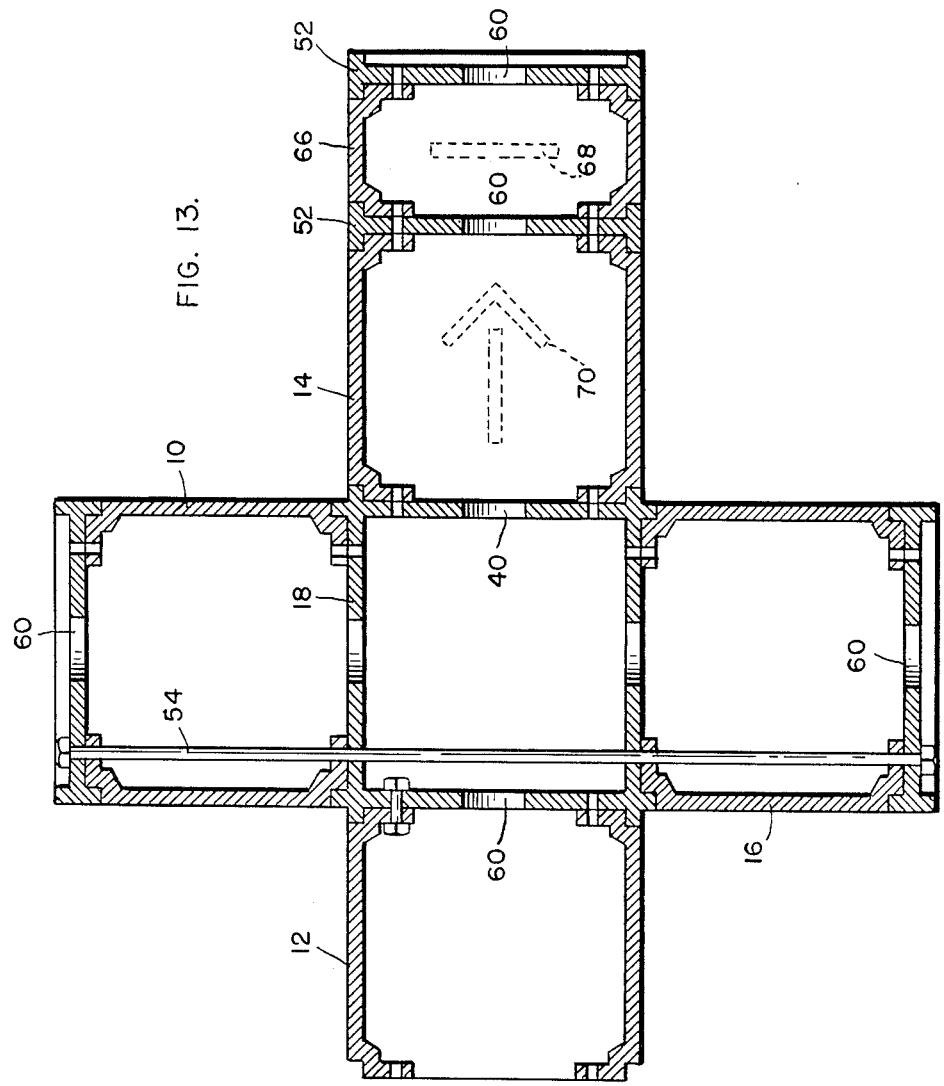
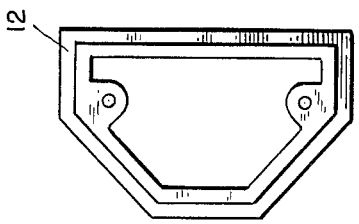
INVENTOR
JAMES ROBERT FERGUSON
BY
ATTORNEYS Feb. 28, 1956   J. R. FERGUSON   2,736,879
TRAFFIC SIGNAL
Filed Sept. 16, 1952   7 Sheets-Sheet 7
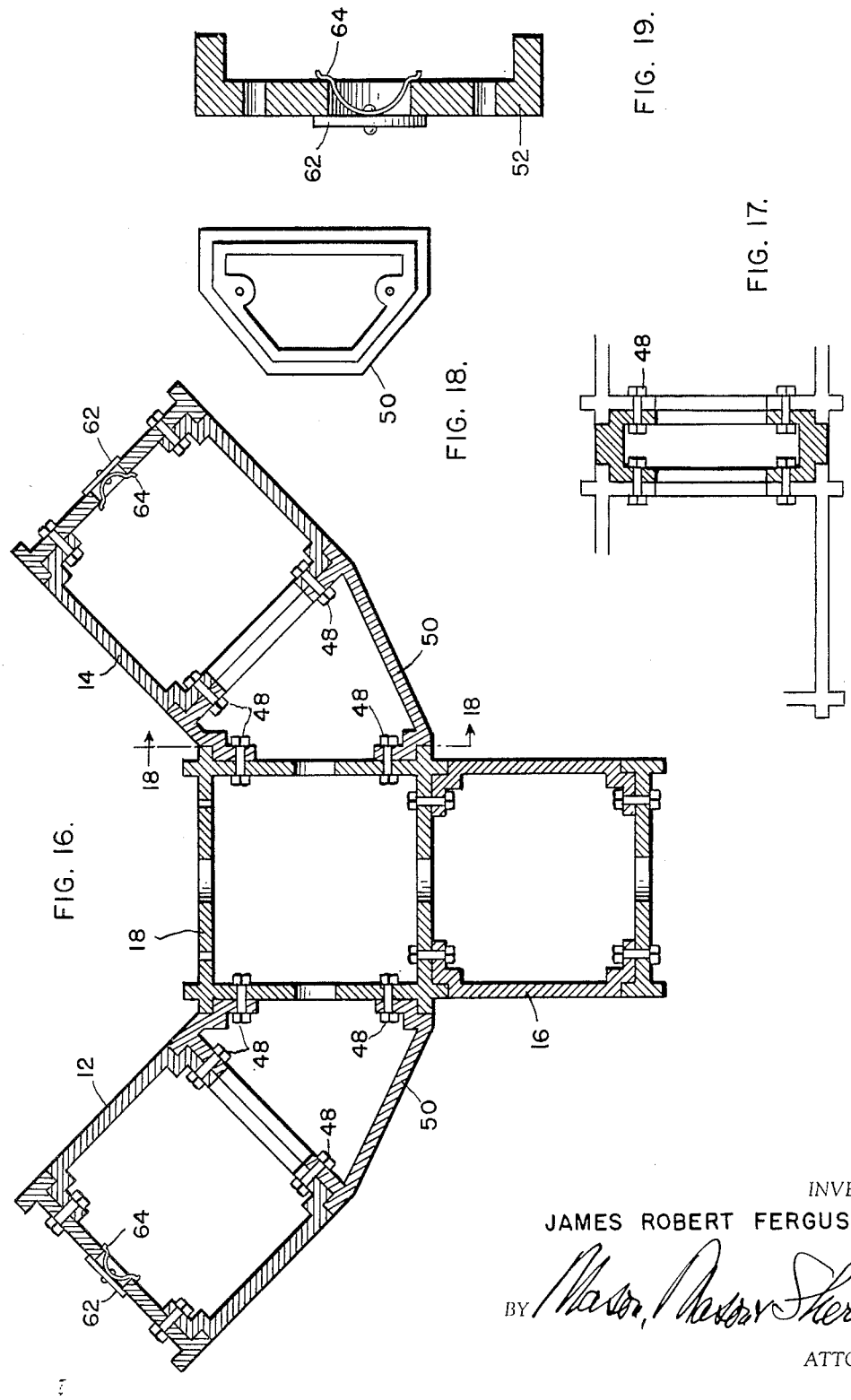
INVENTOR
JAMES ROBERT FERGUSON
BY
ATTORNEYS

United States Patent Office 2,736,879
Patented Feb. 28, 1956

2,736,879

TRAFFIC SIGNAL

James Robert Ferguson, Bristol, Tenn., assignor of one-half to Bristol Steel & Iron Works, Inc., Bristol, Va.-Tenn., a corporation of Virginia Application September 16, 1952, Serial No. 309,836

4 Claims. (Cl. 340—84)

This invention relates to a traffic signal for use at street intersections, and, in particular it relates to an improvement in such traffic signals whereby a minimum number of parts may be assembled for use at different traffic intersections having different shaped intersections, due to the number of streets forming the intersection.

An object of the invention, therefore, is to provide a traffic signal composed of a plurality of sections which may be quickly and interchangeably assembled to indicate different types of street intersections to a motorist as he approaches such intersection. The intersection may be composed of streets which intersect each other at right angles, such as a cross (+), a single street running perpendicular to and terminating at another street (T), a street containing two branches extending at an angle to the first street (Y), as well as other types of intersections.

A further object of the invention is to provide a traffic signal composed of a plurality of attachable signal units, each unit preferably indicating a single signal, such as "Stop," "Caution," or arrows indicating that the traffic should proceed "Straight," or "Right," or "Left," or a bar indicating the stoppage of traffic in a particular traffic lane.

An additional object of the invention is to provide a traffic signal composed of a plurality of signal units with means for attaching said units to each other, and supplemental elements and means whereby they may be attached to at least one of said signal units.

Another object is to provide a traffic signal composed of a plurality of attachable units and employing a minimum number of said units to indicate the outline of a particular street intersection at which the signal is used and also to indicate at proper intervals by use of arrows, the proper lane for traffic movement and the usual caution and stop signals.

Still another object of the invention is to provide a signal of the type described which preferably contains no letters or words, in order that the signal may be understood by those who cannot read the English language.

Other objects will appear hereinafter throughout the specification.

In the drawings:

Figure 13 is a vertical section showing an additional form of traffic signal;

Figure 14 is a vertical section taken on the line 14—14 of Figure 13;

Figure 16 is a vertical section of the structure shown in Figure 15;

Figure 17 is a vertical sectional view of one of the filler units attached to a pair of signal units;

Figure 18 is a side elevation of one of the triangular units shown in Figure 16, and Figure 19 is a vertical section of one of the closure members, and showing a closure cap therefor.

Figure 1:
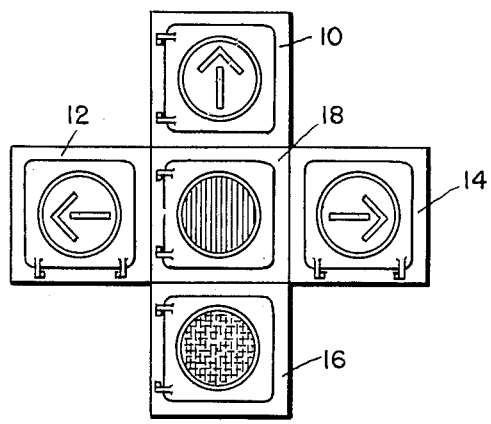
Figure 1 is a front elevation of one form which the traffic signal may take.

The several interchangeable or replaceable signal units shown in the several figures allow for the construction of a plurality of traffic signals, each using a minimum number of basic traffic units, each traffic signal showing the exact outline or configuration of each of several different traffic intersections. The traffic signal will visually indicate instantly to a vehicle driver who is unfamiliar with the intersection, the number of streets forming the intersection and the "shape" of the intersection; i. e., whether these streets form a cross, a T, a Y, a five-street intersection, or any one of a number of other street intersections. This indication is available to the motorist as he approaches the intersection and will show the "shape" of the intersection several streets from said intersection. The motorist will be appraised of the street layout of the intersection some time before he reaches said intersection. By thus informing the motorist of the nature of the intersection which he is approaching, it will be unnecessary for him to decide which street he will use when he reaches the intersection, but he can make this decision some time before he reaches the intersection. Traffic signals of this type greatly facilitate the steady, even flow of traffic, because by the use of such traffic signals, it becomes unnecessary for the driver to slow down or stop when he reaches the intersection in order to determine which street is the correct one for him to take. It will also be possible for the motorist to determine at some distance before reaching the intersection whether he will use the inside or the outside lane of the street on which he is traveling, thereby obviating the necessity of cutting in and out of the travel lanes at the point of heaviest traffic congestion; i. e., at the traffic intersection before the change from the red to the green traffic signal.

In the drawings, referring particularly to Figures 1 to 3, 11 and 13, the numerals 10, 12, 14, 16, and 18 each indicates a single unit, said units being readily attachable to each other by means hereinafter described, in order to make up each traffic signal. These units are shown as being square or rectangular in cross section, but it will be understood that they may be of any other suitable configuration as well, such as oblong, circular, oval, etc. The unit 16 preferably indicates the yellow or caution signal, and unit 18 indicates the stop signal. As shown, each of the other units indicates a direction of travel corresponding with the street of the particular intersection where the traffic signal is located. The numeral 10, therefore, will indicate when illuminated that traffic may proceed straight ahead; when unit 12 is illuminated a 90° right turn is indicated. It will be understood that, ordinarily, no one of the units 10, 12, or 14 will be illuminated concurrently with the illumination of the units 16 or 18; although there are conditions which warrant the illumination for a short period of time of the caution signal concurrently with one of the other signal units 10, 12, or 14. Sometimes also, the caution unit is so timed so that it "merges" with the stop signal, and at such times, the caution signal will be illuminated momentarily after the stop signal is illuminated.

Figure 2:
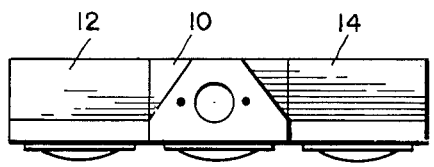
Figure 2 is a top plan view of the structure shown in Figure 1.
Figure 3:
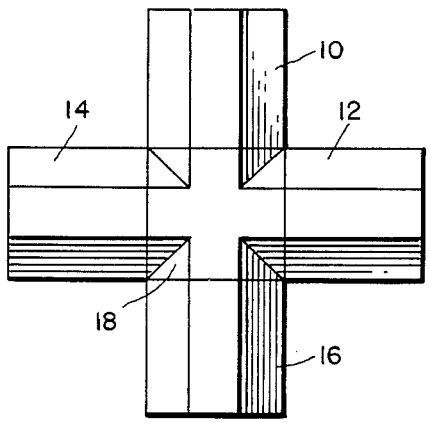
Figure 3 is a rear elevation of the structure shown in Figure 1.
Figure 6:
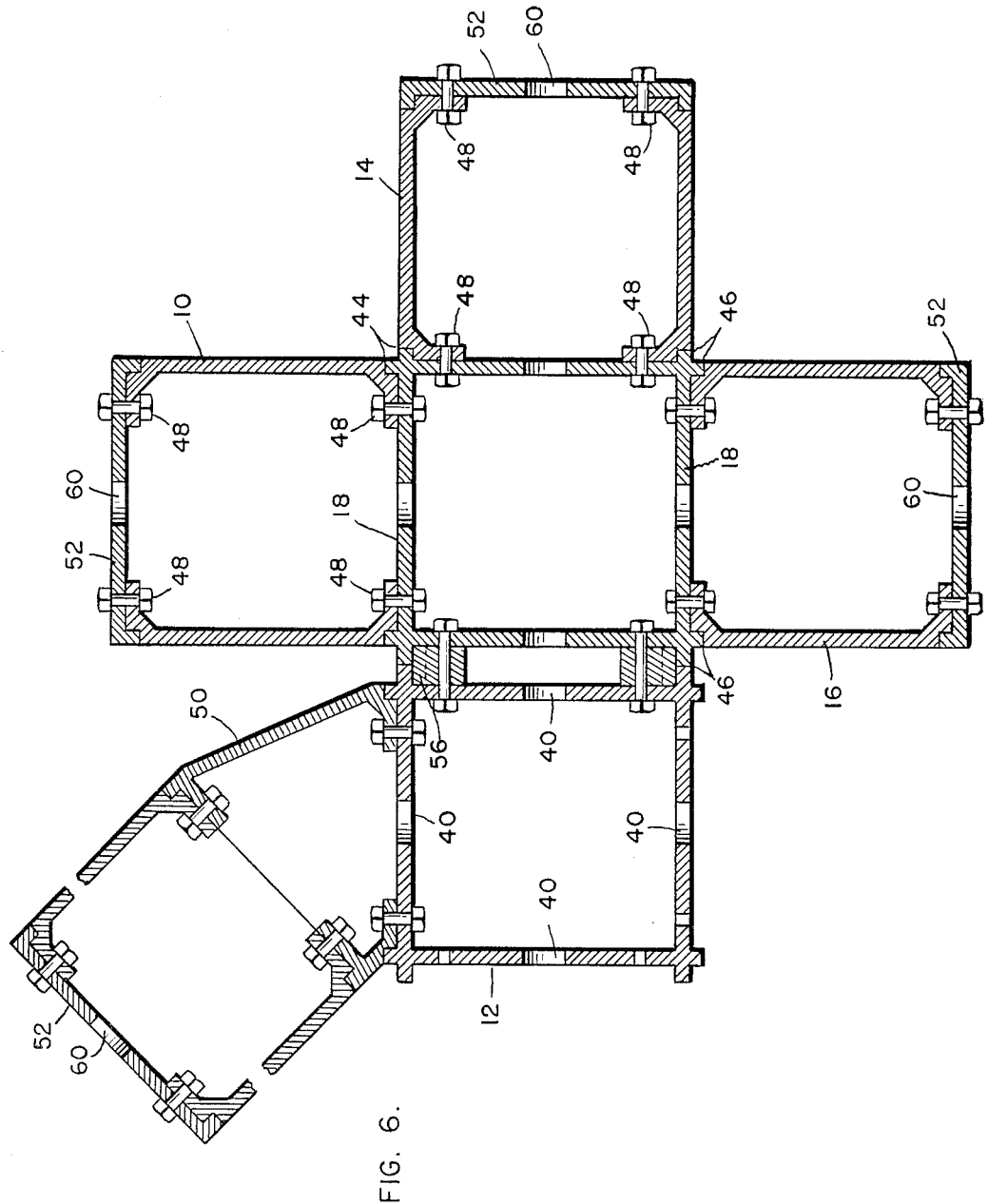
Figure 6 is a vertical sectional view of a five-street-intersection traffic signal.
Figure 9:
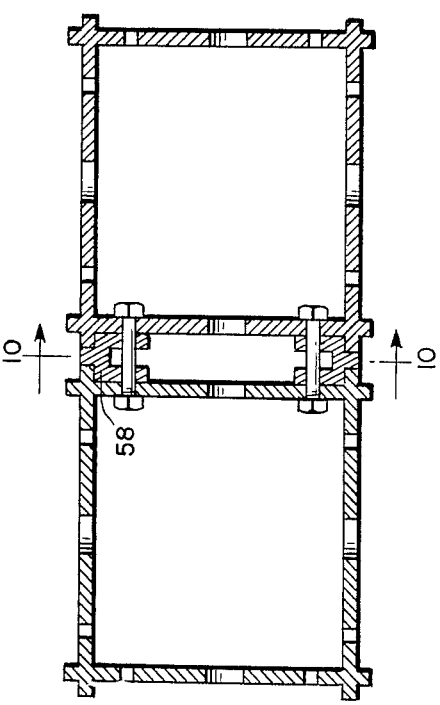
Figure 9 is a vertical section of two signal units with another form of interposed adapter.
Figure 10:
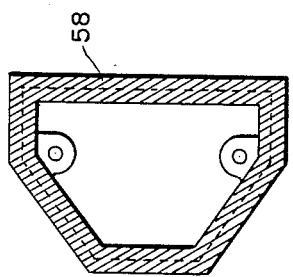
Figure 10 is a vertical section on the line 10—10 of Figure 9.
Figures 11, 12:
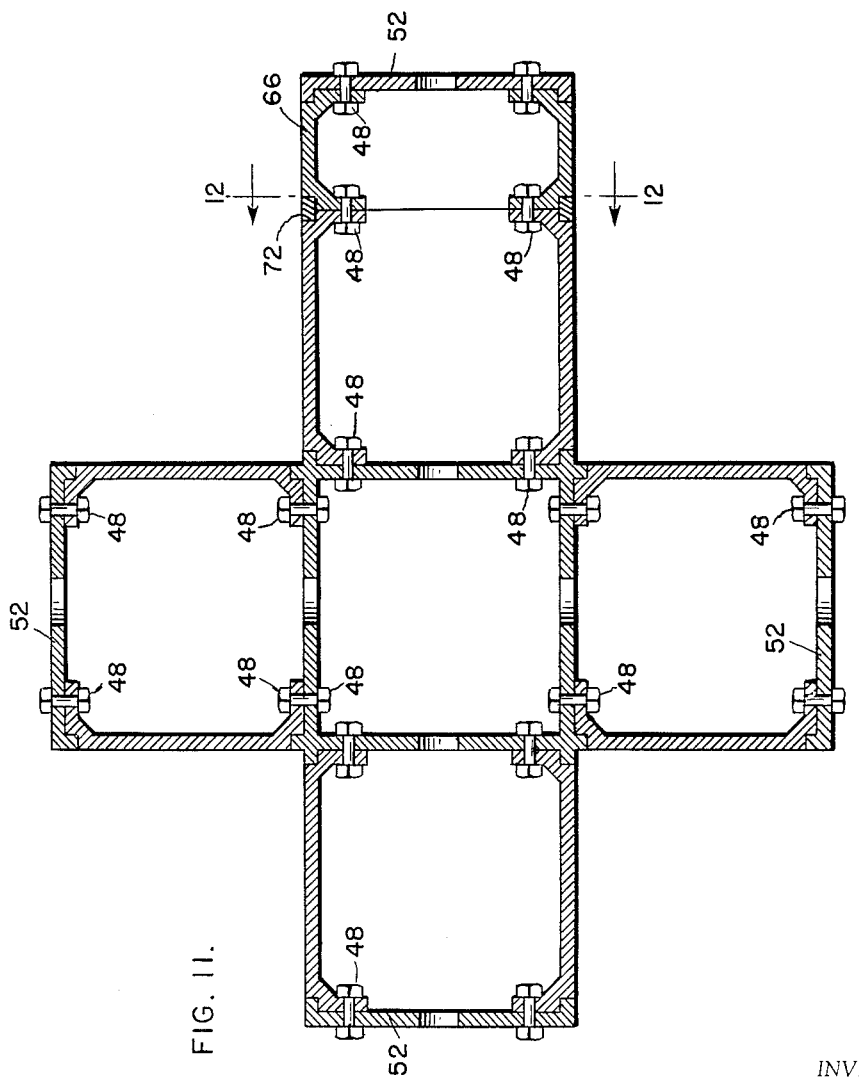
Figure 11 is a vertical sectional view of another form of the invention.
Figure 12 is a vertical section taken on the line 12—12 of Figure 11.

It will be understood further that the arrangement of signal units shown in Figures 1 to 3 may be used with other signal units, such as is shown in Figure 6 and/or with an additional unit shown in Figure 6 with the adapter shown in Figures 6 to 10, and 17 or the supplemental unit shown in other figures, including Figures 6, 12, and 13.

Figure 4:
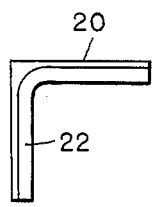
Figure 4 is a front elevation of an attachment showing an angle turn.
Figure 5:
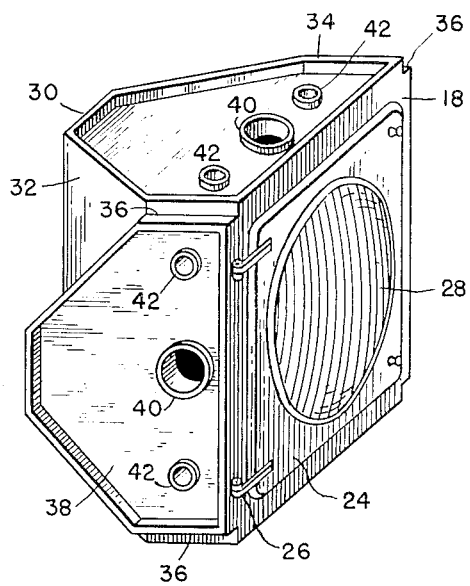
Figure 5 is a perspective view of one of the units.

Referring to Figure 4, the numeral 20 indicates an angle member. Usually four of these members is provided, and they are preferably attached by bolts or other means (not shown) in the right angles formed between the signal units 10 and 14, 10 and 12, 12 and 16, and 14 and 16 of the units shown in Figure 1. Each angle member is provided with a painted-on "road turn" 22, so as to indicate the several turns in a manner similar to that shown in Figures 1 and 5 and as described in column 2, last line, and column 3, lines 1 to 6 of the patent to R. O. Ferguson, No. 2,553,906, May 22, 1951. The signal unit 18, particularly as shown in Figure 5, is provided with an open face (not shown) which is covered by a door 24 mounted on pivots 26 and preferably provided with the usual stop lens 28. The central signal unit shown in Figure 5 has a back 30 including inclined sides 32 and 34. The straight sides are provided with steps 36, and the flanges 44 provided thereby are engaged by the recesses 46 of the side units 12 and 14. It will be understood that the top and bottom surfaces of this unit are identical, as are the two side surfaces. Only the left side surface and the top surface, however, are shown in Figure 5. These include webs 38 or side walls having enlarged apertures 40 that may be used to house sockets for light bulbs or for supporting conduits for electric wiring to a source of illumination in each unit (not shown). The webs 38 are also provided with additional pairs of apertures 42 for the reception of bolts or tie rods hereinafter to be described.

Each of the signal units 12, 14, and 16 is preferably similarly constructed so that it may be readily attached to the unit 18, as shown in Figures 6 to 13 and 16. It will be understood, however, that instead of having the central unit 18 provided with flanges which are engaged by the grooves of the other units, this unit 18 may have grooves and the other surrounding units can be provided with flanges. The invention is susceptible, however, of having a central unit with grooves or flanges, and the surrounding or attaching units with corresponding flanges or grooves, without modifying the invention.

In Figure 6, unit 18 is provided with flanges 44 which fit corresponding steps or recesses, and each signal unit is held to another signal unit by threaded bolts 48 having nuts attached thereto. These bolts may also serve to fasten the angled unit 50 and the end caps 52 to a signal unit. In place of one or more of the short bolts 48, through-bolts or tie-rods 54 may be used, such as shown in Figure 13.

Figure 7:
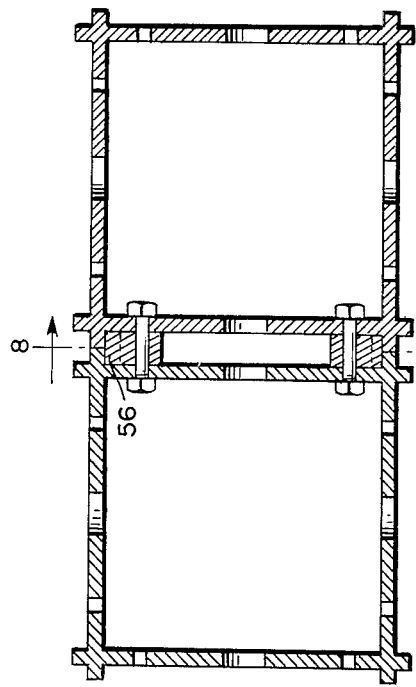
Figure 7 is a vertical section of two signal units with an interposed adapter.
Figure 8:
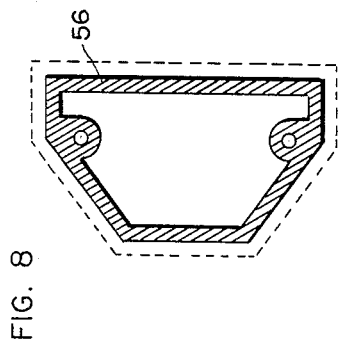
Figure 8 is a section on the line 8—8 of Figure 7.

As shown in Figure 6, in order to accommodate the angled unit 50 shown in this figure, an adapter 56 is used between signal units 12 and 18. This adapter is also shown in Figures 7 and 8. In place of the adapter shown in these figures, an adapter 58 of Y cross section, as shown in Figures 9 and 10, may be used. The end caps 52 are provided with apertures 60. These apertures or apertures 40 may be closed by hole plug 62, as seen in Figure 19. The hole plug may be retained in place by a suitable spring 64.

As seen in Figures 12 and 13, a supplemental unit 66 may be attached to any one of the signal units other than the central signal unit, and the end cap 52 attached thereto as shown. This supplemental unit preferably encloses red stop bar 68, as shown in dotted lines in Figure 13. When this stop bar is illuminated, the light which illuminates the arrow 70 in unit 14 is extinguished, in accordance with a conventional timing mechanism.

In place of using the end cap 52 which is located between unit 14 and supplemental unit 66, there may be used instead, a filler rim 72, as shown in Figures 11 and 12.

Figure 15:
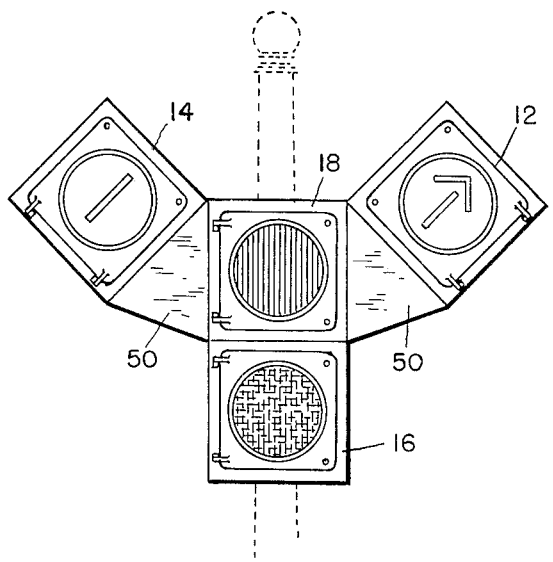
Figure 15 is a front elevation of another form of traffic signal.

Referring to Figures 15 and 16, the signal here shown is in the shape of a Y. In this construction, units 16 and 18 have been used as well as units which correspond to any one of the units 10, 12, and 14 and in addition, angle units 50 have been used. These are all connected by threaded bolts 48, as seen in Figure 16. No source of illumination is maintained in the angle units 50, but the signal units are all preferably provided with their own source of illumination and timed in accordance with accepted practice, usually from a master remote control timing mechanism.

It will be understood that each of the units is preferably provided with a pivoted door and a lens constructed similar to that described above in connection with the unit 18.

The above description and drawings disclose several embodiments of the invention, as specifice language has been employed in describing the several figures. It will, nevertheless, be understood that no limitations of the scope of the invention are thereby contemplated, and that various alterations and modifications may be made such as would occur to one skilled in the art to which the invention relates.

Having thus described the invention, what is claimed as new and what is desired to be secured for Letters Patent is:

I claim:

1. A traffic signal comprising a hollow central signal unit adapted to have branch signal unit secured thereto and to extend outwardly therefrom, said central signal unit comprising substantially horizontally disposed top and bottom walls, and substantially parallel side walls extending between and connected to said top and bottom walls, and a front face, said walls each having a pair of spaced parallel flanges projecting outwardly therefrom, each of said flanges being disposed adjacent an edge of a wall, a branch signal unit on one of said walls and engaging the flanges thereon, means to secure said units together, the front face of each unit being provided with an opening, a door to close said opening, a lens mounted in said door, a second branch signal unit mounted on one side of said first branch unit, means for mounting said second branch unit on said first branch unit comprising a triangular member attached to said first branch unit and having one side inclined downwardly with respect to said first branch unit, and said second branch unit being attached to said inclined side.

2. A claim as defined in claim 1, wherein a branch signal unit is mounted on each of said walls of said central signal unit, and certain of said branch signal units are each provided with a detachable cap closing its outer end.

3. A traffic signal comprising a central signal unit, said unit having substantially horizontally disposed top and bottom walls and substantially vertically disposed parallel side walls, said walls each having a pair of spaced parallel flanges projecting outwardly therefrom, each of said flanges being disposed adjacent an edge of a wall, a triangular supporting member for mounting a branch signal unit on said central signal unit, means for attaching one side of said triangular member to one of said walls of said central signal unit, said means comprising a pair of spaced parallel grooves in one side of said member, said grooves being complementary to and fitting over a pair of said flanges on said one wall, a hollow branch signal unit detachably secured to another side of said triangular member, said last-mentioned side being disposed at an angle of substantially forty-five degrees to said wall of said central signal unit so as to position a signal carried by said branch signal unit to one side of and in a different horizontal plane from the signal carried by said central signal unit, said branch signal unit having opposite sides each provided with a pair of like grooves identical with those in said one side of said triangular member so that each of said opposite sides of said branch signal unit and said one side of said triangular member may be interchangeably connected to any one of said walls of said central unit in order to form traffice signals of different configurations depending upon the number of roadways to be controlled at any given intersection.

4. A claim as defined in claim 3, wherein each of said side walls on said central signal unit is provided with one of said triangular members and a branch signal unit mounted on said member, and one of said horizontally disposed walls of said central signal unit carries a third branch signal unit.

References Cited in the file of this patent

UNITED STATES PATENTS

| | | |
|---|---|---|
| D. 148,528 | Ferguson | Feb. 3, 1948 |
| D. 169,897 | Ferguson | June 23, 1953 |
| 1,552,816 | Bledsoe | Sept. 8, 1925 |
| 1,711,480 | Halvorson | Apr. 30, 1929 |
| 1,836,845 | Halvorson | Dec. 15, 1931 |
| 1,847,775 | Manfre | Mar. 1, 1932 |
| 2,107,777 | Bissell | Feb. 8, 1938 |
| 2,182,434 | Hohl | Dec. 5, 1939 |
| 2,294,883 | Anderson | Sept. 8, 1942 |
| 2,553,906 | Ferguson | May 22, 1951 |

FOREIGN PATENTS

| | | |
|---|---|---|
| 716,884 | France | Oct. 13, 1931 |
| 821,810 | Germany | Nov. 21, 1951 |